Nov. 3, 1959   B. F. PHILLIPS   2,910,993
VEHICLE WASHING APPARATUS
Filed May 27, 1957   2 Sheets-Sheet 1

INVENTOR,
Bernal F. Phillips

Nov. 3, 1959  B. F. PHILLIPS  2,910,993
VEHICLE WASHING APPARATUS
Filed May 27, 1957  2 Sheets-Sheet 2
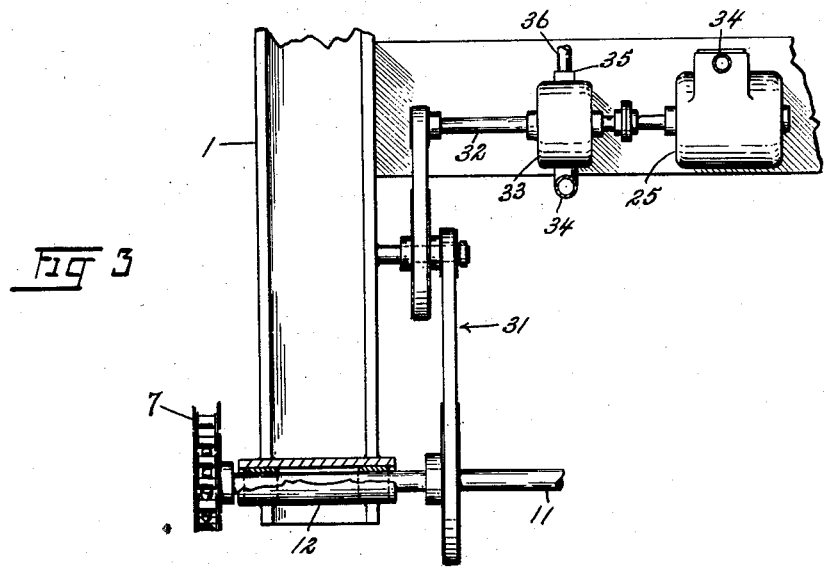
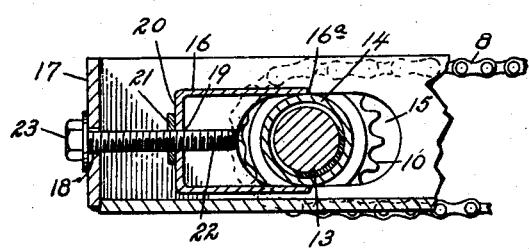
INVENTOR,
Bernal F. Phillips.

2,910,993
VEHICLE WASHING APPARATUS

Bernal F. Phillips, Woodhill, Ontario, Canada

Application May 27, 1957, Serial No. 661,842

1 Claim. (Cl. 134—123)

The invention relates to improvements in vehicle washing apparatus as described in the present specification and shown in the accompanying drawings that form a part of the same.

Prior art apparatus for washing vehicles have included spraying devices reciprocable lengthwise of the vehicle but up to the present such apparatus has been usually very costly to install and maintain, due to a great extent to the inclusion of the considerable mechanism needed for reversing the direction of movement of the spraying devices.

The main object of the present invention is to provide efficient vehicle washing apparatus of simple and inexpensive construction, particularly adaptable for use in service stations and the like where conservation of space is of importance, and which does not require constant attention during the entire washing process so that where the necessity arises for the washer to give attention to some other matter, such as serving a customer, the spraying operation need not be interrupted.

Another important object of the invention is to provide for continuous reciprocation of the spraying devices without the necessity of providing a costly transmission assembly to reverse the direction of travel of the carrier for the spray devices.

An important feature of the invention resides in the manner of supporting the movable carrier for the spray devices, whereby it can be swung in an arc irrespective of its reciprocal movement lengthwise of the vehicle.

With the above and other objects in view the invention consists in the novel features of construction, arrangements and combinations of parts set out herein and more particularly pointed out in the claim for novelty which follows.

In describing the invention reference will be made to the accompanying drawings, in which:

Figure 3 is a fragmentary plan view partly in section, to show the motor and the drive for one of the carrier chains.

Figure 4 is a vertical section through one of the main frame members, taken on the line 4—4 of Figure 1.

Like numerals of reference indicate corresponding parts in the various figures.

Figure 1:
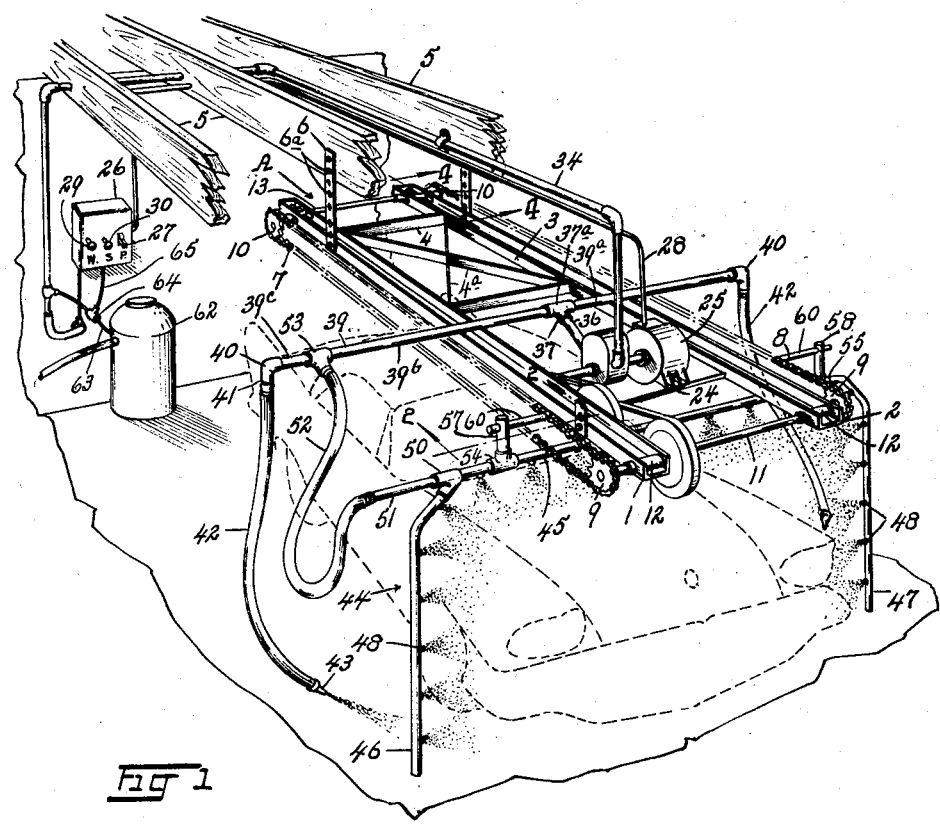
Figure 1 is a perspective view showing my improved vehicle washing apparatus in process of washing a car (shown in broken lines) a portion of the supporting structure being broken away for clarity.
Figure 2:
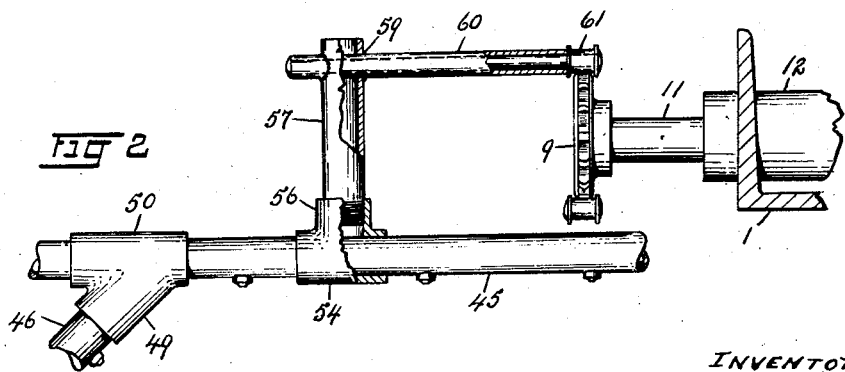
Figure 2 is a fragmentary front elevation, partly in section, taken on the line 2—2 of Figure 1.

Referring to the drawings. As a means of support the various mechanical elements which combine to provide the major part of my invention I employ a frame, indicated generally by the reference character A, which is adapted to be suspended above the vehicle being washed and slightly to one side of the transverse centre of the space provided for the accommodation of the vehicle.

The frame A consists of parallel metal side members 1 and 2, of upwardly opening channel shape in cross section, and being of sufficient length to at least equal the longitudinal extent of any vehicle which might be driven therebeneath for washing. The side members 1 and 2 are rigidly connected together to comprise a unit by means of an interiorly positioned frame which is located preferably to the rear of the longitudinal centre of the frame A and which consists of metal strap-like sides 3 which extend along the opposing faces of the frame members 1 and 2 and are welded or otherwise secured thereto, end members 4 connecting the sides 3, and diagonal braces 4a.

The frame A is relatively narrow in comparison with the space allotted therebelow for the vehicle and is located preferably nearer one side of such space than the other and the said frame is suspended from ceiling beams 5, or from other suitable overhead members, by means of metal hangers 6 which are bolted or otherwise secured to the side members 1 and 2 and to the supporting means. The hangers 6 may, if desired, have a plurality of holes 6a arranged in vertically spaced relation to one another to allow of adjusting the frame A vertically in respect to the floor. The frame A may be supported at as many points as may be considered necessary to securely hold it and the various elements it carries against dislodgement.

Positioned at opposite sides of the frame A in outwardly spaced relation to the sides 1 and 2 thereof are endless sprocket chains 7 and 8 which are adapted for simultaneous operation lengthwise of said frame to carry the spray elements backwards and forwards in the manner about to be described. These chains operate over front and rear sprocket wheels 9 and 10, respectively, the front sprocket wheels 9 being fixed to a driven shaft 11 which extends transversely of the frame A at the forward end thereof and is journaled for rotation in bearings 12 mounted in the parallel flanges of the respective side members 1 and 2, and the rear sprocket wheels 10 being fixed to an idle shaft 13 which extends transversely of the frame A near the rear end of the latter and is rotatably journaled in tubular bearings 14 mounted in the side flanges of the frame members 1 and 2. The tubular bearings for the idle shaft 13 extend through slots 15 in the side flanges of the side members 1 and 2, such slots being elongated lengthwise of said side members so that the idle shaft may be adjusted lengthwise of the main frame to tighten or loosen the chains 7 and 8 as may be necessary.

In order to accomplish the movement of the idle shaft lengthwise of the frame A there are provided within the channels of the side members 1 and 2 and rearwardly of the bearings 14 substantially U-shaped brackets 16, the arms of which straddle the said bearings, as shown at 16a and are secured thereto by welding, or by other means. The rear ends of the channel side members 1 and 2 are closed by plates 17 and extending loosely through apertures 18 in said closures and threading into threaded apertures in the ends 20 of the brackets 16 and through nuts 21 fixed on said ends are threaded bolts 22 having heads 23 positioned exteriorly of the closures 17, so that movement of the idle shaft 13 can readily be effected simply by turning the bolts 22 in the required direction.

A shelf 24 positioned near the front end of the frame A and extending between the side members 1 and 2 and supported thereby provides the support for a motor 25 by means of which the shaft 11 is rotated to cause the chains 7 and 8 to be driven. The current to the motor is conducted through suitable wiring leading to the motor from a switch mechanism (not shown) mounted in a control box 26. A switch lever 27 extending through a suitable slot in the wall of the control box provides means for operating the switch mechanism. The electric wiring is enclosed in a suitable conduit 28 which extends for support through the beams 5.

The control box 26 is preferably mounted on a wall or other support conveniently located with respect to the work and said box preferably provides the housing for valves (not shown) controlling the supply of water and the supply of soap or other liquids used in the washing and polishing of the vehicle, said valves being operated by means of levers 29 and 30 extending to the exterior of the box 26.

The shaft 11 is driven by the motor 25 through a drive assembly, indicated generally at 31, suitably connected with the motor shaft 32. Such drive assembly is so constituted as to provide the required drive ratio between the motor and the shaft 11.

Mounted on the motor shaft 32 is a pump casing 33 containing conventional pump mechanism (not shown in detail as any of several well known types may be used) operated by the said motor shaft, the said pump casing having an inlet at one side receiving liquid from a supply pipe 34 leading from the source of supply and having its flow controlled by the valve lever 29 located exteriorly of the control box 26.

The pump casing has a fluid outlet 35 in communication with a pipe 36 which extends rearwardly at a slight upward angle and enters the arm 37 of a tubular T-fitting, which latter has a cross head 37a. A fluid line 39 extends through the cross head 37a and is supported thereby. This line 39 extends transversely of the frame A and in length is somewhat longer than the width of the space allotted for the vehicle so as to project therebeyond at each side. The line 39 preferably comprises three lengthwise aligned pipe sections 39a, 39b and 39c, of which the section 39a and 39b screw into opposite ends of the cross head 37a and are spaced endwise within the crosshead so that each will receive liquid from the pipe 36 to flow in opposite directions. The sections 39b and 39c thread into the opposite ends of the cross head of a hollow fitting 53 and are spaced endwise within said fitting.

The line 39 is provided at its ends with elbows 40 to the downwardly turned arms 41 of which are attached flexible hose members 42 having nozzles 43 mounted on their ends. These hose members are for use particularly in washing the wheels and tires of the vehicle and they are of sufficient length to be conveniently used in the washing of both front and rear wheels and tires.

44 denotes generally a tubular spray head which is of substantially inverted U-shape and comprises specifically a cross line 45 of a length substantially equal to, or slightly greater than, the width of a vehicle, and downwardly extending tubular legs 46 and 47 spaced to receive the vehicle therebetween. The cross pipe 45 and the downwardly extending legs are provided throughout their lengths with fluid outlets closely spaced and provided with nozzles 48 so directed as to cause fluid flowing through the tubular members to be sprayed against the top and sides of the vehicle.

The leg 47 of the spray head may be integral with the cross pipe 45 and provided by bending the said pipe at right angles to provide said leg but, the leg 46 preferably comprises a separate pipe threading into the arm 49 of a substantially Y-shaped fitting 50, which latter has its stem threaded onto the cross pipe 45 and has its other arm threaded interiorly to receive the threaded end of a short pipe 51 spaced endwise from and longitudinally aligned with the pipe 45 to allow a portion of the liquid passing through the line to flow into the leg 46 and providing beyond said fitting an endwise extending part 7 said line. This extending part 51 is connected by means of a flexible hose 52 with the interior of the T-fitting 53 in the cross head of which the sections 39b and 39c of the feed pipe 39 are threaded in endwise spaced relation to each other, so that some of the liquid flowing through the pipe 39 will flow into the hose 52, and the cross pipe 45 is apertured within the fitting 50 so that liquid entering the hose 52 and flowing into the part 51 of the said cross pipe will be divided, part thereof flowing straight through said pipe 45 to feed the nozzles in said pipe and in the leg 47 and part flowing into the leg 46 to be delivered through the nozzles carried thereby.

The spray head 44 is adapted to be suspended at opposite sides of the frame A from the sprocket chains 7 and 8 so that as the said chains operate over the sprocket wheels 9 and 10 through the rotation of the driven shaft 11 the spray head will be moved therewith and will have its direction of travel reversed each time it is carried around a pair of sprocket wheels.

As means for suspending the spray head from the chains 7 and 8 the cross pipe 45 has fixed thereon T-fittings 54 and 55 through the cross heads of which said pipe extends, the said fittings being spaced from each other a greater distance than the space between said chains so as to be positioned short distances outside said chains. The fittings 54 and 55 have their arms 56 extending upwardly and these arms are threaded interiorly and receive the exteriorly threaded ends of tubular uprights 57 and 58. These tubular uprights are in length but slightly greater than the vertical space occupied by a chain structure. The uprights are provided with transverse circular openings 59 to loosely receive the outer ends of horizontally disposed tubular hangers 60 which extend inwards towards the associated sprocket chains and are fixed at their inner ends to the sprocket chains at transversely aligned points.

The hangers 60 may be secured to the sprocket chains in any siutable manner which will provide a firm support for the spray head. As shown herein the hangers are substituted for the conventional hinge pins at the appropriate points, the ends of the hangers being continued through the overlapping hinge parts 61.

It will thus be seen that the spray head being suspended from the chains will move with said chains and on each turn of the chains around transversely aligned sprocket wheels the direction of movement of said spray head will be reversed.

In the washing of a vehicle it is usual to apply to the surface of same sequentially different fluids, such as water for softening dirt, a saponaceous preparation, and a rinsing agent and it is known to feed the different fluids through a single feed line, such as the pipe 34, suitable valves being provided to control the fluids and mixtures. As means for this purpose is now quite well known, it is thought unnecessary to show in detail such means but by way of illustration an arrangement is indicated wherein a tank 62 to contain a detergent, with wax added if desired, is located in proximity to the control box 26 and this tank is connected by means of a pipe 63 to the liquid line 34 whereby material within the tank may be carried to the delivery nozzles in the spray head. Suitable valve means (not shown) within a connecting fitting 64 interposed in the pipe 63 and having connection through the line 65 with the lever 30 provides the means for controlling the release of material from the tank 62 to the line 34.

In the operation of the invention the motor is energised by moving the electric switch control 27 in the control box 26, upon which the driven shaft 11 will be rotated through the medium of the motor shaft 32 and the drive assembly 31, thus causing the chains 7 and 8 to be moved lengthwise of the frame A. As the spray head is suspended from the chains it will be moved lengthwise of the vehicle and its direction of movement will be reversed as the chains round the sprocket wheels 9 and 10. As the uprights 57 and 58 are swingingly mounted on the hangers 60 the spray head will normally maintain a vertically balanced position.

Coincident with the energising of the motor the pump mechanism will be set in motion and will cause material to be moved through the liquid line and to be delivered through the pipe 36 to the cross pipe 39 which in turn delivers such material to the hose members 42 and to the hose line 52. The hose members 42 are handled by the attendant and can be directed towards either front or rear wheels and tires at the corresponding sides of the vehicle. The material flowing through the hose line 52 is delivered into the extension 51 of cross pipe 45 of the spray head and thus to the depending legs 46 and 47 and is sprayed by means of the nozzles 48 in the said pipe 45 and legs 46 and 47 against the top and sides of the vehicle as the spray head is reciprocated throughout the length of the vehicle.

The nature of the liquid to be delivered from the hose members 42 and the nozzles 48 is controlled by the control devices 29 and 30. For instance, if but water is to be used, as is customary as a preliminary softener, the device 29 controlling the water supply to the line 34 is operated. If the vehicle is to be sprayed with a saponaceous agent, with wax added if such is contained in the tank 62, it may be added to the water by operating the control device 30, which allows material from the tank to be drawn into the line 34 and mixed with water.

In the event that the chains 7 and 8 require to be tightened this may be accomplished easily and quickly by applying a tool to the heads 23 of the bolts 22 and turning same in the direction necessary to draw rearwardly on the tubular members 14 through which the idle shaft 13 extends.

By the present invention efficient washing apparatus is provided at low installation cost, such apparatus consisting of few parts readily obtainable and easy to assemble. The washing operation can be carried out quickly and efficiently by one attendant.

While I have shown and described herein the present preferred construction and arrangement for carrying out my said invention, it is capable of variation and modification. I, therefore, do not wish to be limited to the precise details of construction and arrangement set out herein but desire to avail myself of such variations and modifications as come within the scope of the appended claim.

What I claim as my invention is:

In vehicle washing apparatus, a frame comprising side and end members supported above and lengthwise of a space adapted to be occupied by a vehicle to be washed, a pair of shafts extending parallel with one another transversely of said frame at opposite ends thereof, said shafts being journaled in said side members and having end parts projecting outwardly beyond said side members, one of said shafts being driven, sprocket wheels mounted on the ends of said shafts beyond said frame side members, the sprocket wheels at corresponding sides of said frame being longitudinally aligned, endless sprocket chains operating in parallel lengthwise of the vehicle over the longitudinally aligned sprocket wheels, rigid hanger arms extending outwardly in a horizontal plane from said sprocket chains at opposed points, a substantially inverted-U-shaped sprinkler member comprising a cross pipe and downwardly extending legs adapted to receive a vehicle therebetween, arms swingingly depending from said hanger arms and connected at their lower ends to said cross pipe of said sprinkler member, a uni-directional motor having driving connection with said rotatable shaft for driving said sprocket chains to cause reciprocal travel of said sprinkler member, and means for supplying liquid from a source of supply to said sprinkler member.

References Cited in the file of this patent
UNITED STATES PATENTS

| | | |
|---|---|---|
| 2,544,066 | Chenault | Mar. 6, 1951 |
| 2,558,472 | Wilcox | June 26, 1951 |
| 2,676,600 | Vani | Apr. 27, 1954 |
| 2,756,759 | Swain | July 31, 1956 |
| 2,764,893 | Falkenberg | Oct. 2, 1956 |